United States Patent [19]
Greene et al.

[11] 3,883,472
[45] May 13, 1975

[54] FAST CURING HEAT STABLE ELASTOMERIC COMPOSITIONS

[75] Inventors: Robin Nikolas Greene, New Albany, Ind.; Kathrine Johnson Lewis, West Los Angeles, Calif.

[73] Assignee: E. I. du Pont de Nemours & Company, Wilmington, Del.

[22] Filed: May 22, 1974

[21] Appl. No.: 472,422

Related U.S. Application Data

[63] Continuation-in-part of Ser. No. 387,050, Aug. 9, 1973, abandoned.

[52] U.S. Cl. ........ 260/42.52; 260/42.29; 260/42.37; 260/80.8; 260/86.1 E
[51] Int. Cl. ... C08f 15/40; C08f 15/16; C08f 45/08
[58] Field of Search ........... 260/80.8, 86.1 E, 42.29, 260/42.37, 42.52

[56] References Cited
UNITED STATES PATENTS
2,599,123  6/1952  Pinkney et al. .................. 260/78.5

OTHER PUBLICATIONS

Encyclopedia of Pol. Sci. & Techn. (Vol. 1) (Interscience) (N.Y.) pages 84–85 & 229–235, (1964), TP.156.P6.E5.

*Primary Examiner*—Donald E. Czaja
*Assistant Examiner*—H. H. Fletcher

[57] ABSTRACT

Novel, fast curing elastomeric compositions having good scorch resistance containing an acrylic ester/butenedioic acid monoester dipolymer or ethylene/acrylic ester/butenedioic acid monoester terpolymer and are vulcanized in the presence of polyfunctional, organic, primary amines, and of accelerators, such as alkali metal or quaternary ammonium salts of weak acids, hydroxides, alcoholates, or phenolates. The heat stability of the vulcanized compositions is improved by the addition of antioxidants. The vulcanizates of this invention are useful, for example, in the manufacture of such automotive accessories as ignition wire jacketing, sparkplug boots, hoses, belts, seals, and gaskets.

10 Claims, 5 Drawing Figures

Ex. 1

Ex. 2

Ex. 3

Ex. 4

Ex. 5

Ex. 6

Ex. 7

Ex. 8

Ex. 9

Ex. 10

Ex. 11

Ex. 12

Ex. 13

Ex. 14

Ex. 15

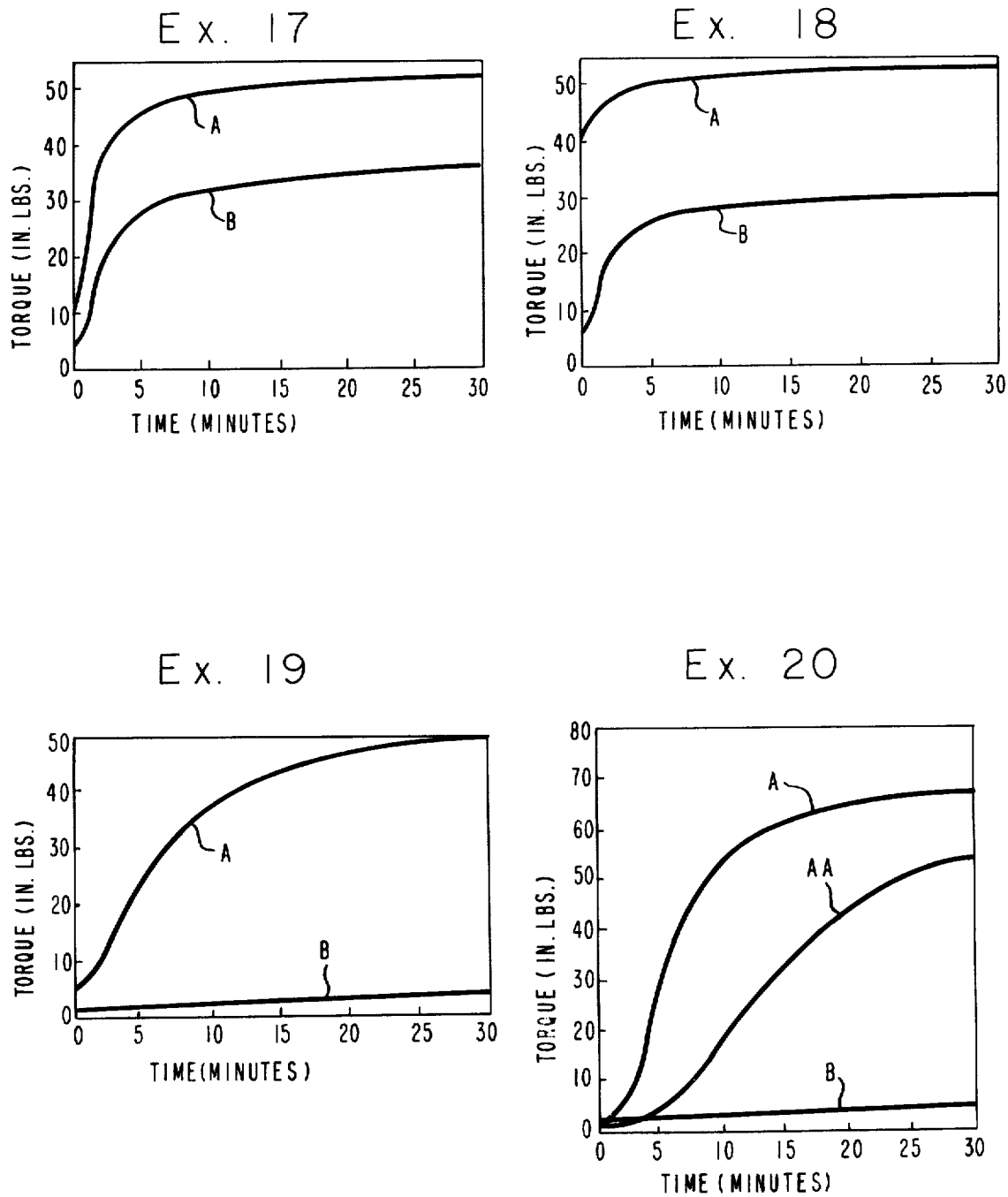

3,883,472

FAST CURING HEAT STABLE ELASTOMERIC COMPOSITIONS

REFERENCE TO PRIOR APPLICATION

This application is a continuation-in-part of U.S. application Ser. No. 387,050, filed Aug. 9, 1973, and now abandoned.

BACKGROUND OF THE INVENTION

This invention relates to fast curing, scorch and heat resistant polymeric compositions containing a dipolymer of an acrylic ester and a butenedioic acid monoester or a terpolymer of the above monomers with ethylene.

Elastomeric polymers containing carboxylic groups or carboxylic ester groups are known to the art. Thus, U.S. Pat. No. 2,849,426 discloses copolymers of a conjugated diene with at least one carboxyl-containing monomer, such as acrylic acid and its various homologs and derivatives, α-methylenedicarboxylic acids and their monesters, and β-substituted unsaturated acids and their monoesters. These polymers are vulcanized in the presence of metal oxides or hydroxides or polyamines, corresponding ionic crosslinks being formed. U.S. Pat. No. 2,579,492 teaches that poly(alkyl acrylates) can be vulcanized by heating in the presence of polymethylenediamines or polyethyleneamines.

SUMMARY OF THE INVENTION

According to this invention, there are now provided novel fast curing elastomeric compositions which have good scorch resistance. The vulcanized compositions have good heat resistance. The polymeric component is an acrylic ester/butenedioic acid monoester dipolymer or ethylene/arcylic ester/butenedioic acid monoester terpolymer.

For the purpose of this invention, the term "acrylic ester" means an alkyl acrylate or methacrylate wherein the alkyl group has 1–4 carbon atoms, and the butenedioic acid monoester is a $C_1$–$C_{12}$ alkyl or a $C_6$–$C_{12}$ aryl maleate or fumarate.

The dipolymer contains about 1–10 weight percent of the butenedioic acid monoester. The terpolymer contains up to 10 weight percent, preferably about 2 to 10 weight percent, of the butenedioic acid monoester, and the proportion of all the ester groups in the terpolymer is equivalent to about 2.5–8.0 moles per kilogram of polymer.

The compositions are vulcanized in the presence of polyfunctional, organic, primary amines and their salts, for example, carbamates or dibenzoates. An accelerator must be present during vulcanization. Suitable accelerators are any bases or conjugate bases (according to the Bronstedt-Lowry theory) whose Kb at 25°C. in water is comprised within the range of $10^{116\ 12}$ to $10^6$, and which do not cause crosslinking by reaction with ester groups.

BRIEF DESCRIPTION OF THE DRAWINGS

FIGS. 1–5 represent Oscillating Disk Rheometer (ODR) data for rubber stocks obtained in Examples 1 – 20. Each graph is identified by the number of the Example to which it pertains. The ODR data are presented as plots of torque in in.lbs vs. time in minutes. In each case, the curve A or AA representa a stock containing an accelerator, while the curve B represents a stock that does not contain an acceleraor.

DETAILED DESCRIPTION OF THE INVENTION

Figure 1:
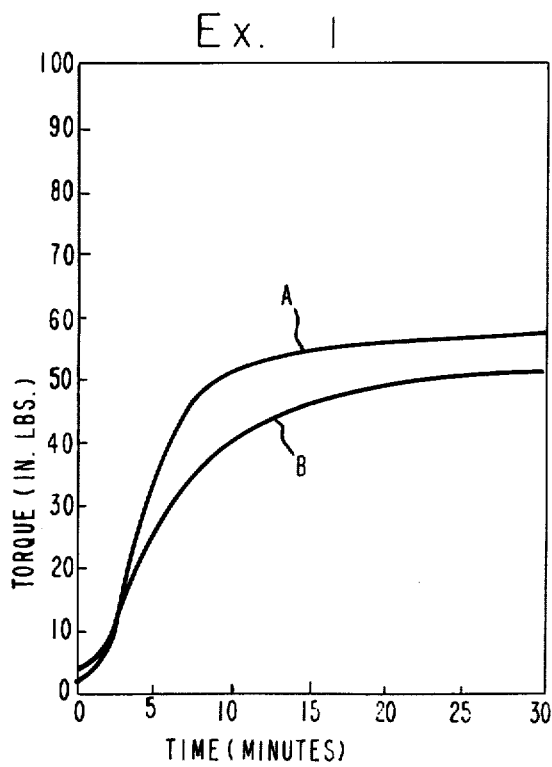
Figure 1:
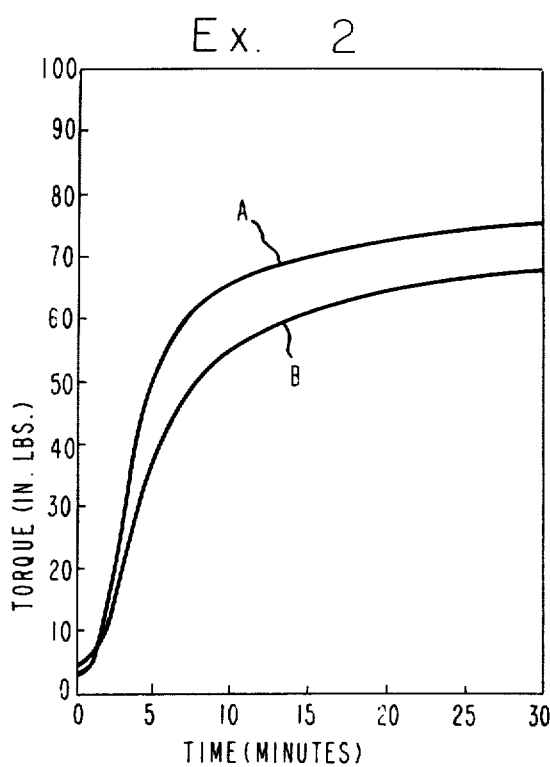
Figure 1:
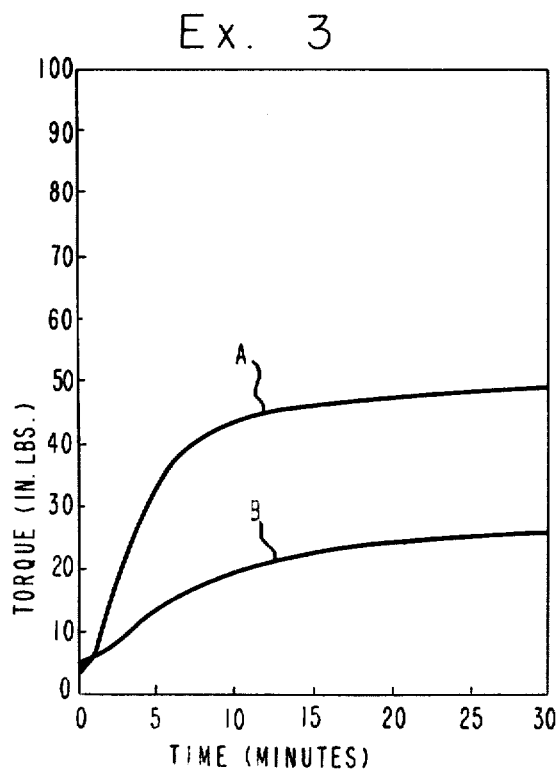
Figure 1:
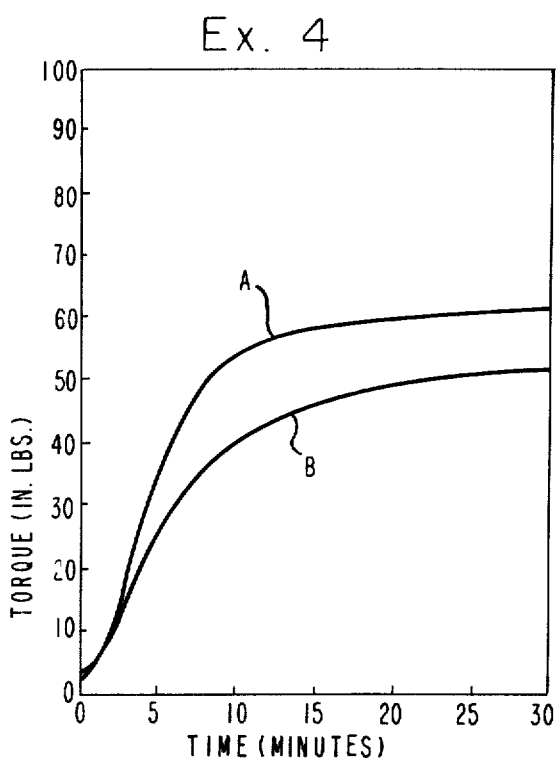

The acrylic ester component of the polymeric compositions of the present invention is methyl acrylate, ethyl acrylate, propyl acrylate, isopropyl acrylate, a butyl acrylate, methacrylate, ethyl methacrylate, propyl methacrylate, isopropyl methacrylate, or a butyl methacrylate.

The butenedioic acid monoester component of the instant polymeric compositions may be, for example, methyl, ethyl, propyl, butyl, pentyl, hexyl, heptyl, octyl, nonyl, decyl, undecyl, dodecyl, phenyl, tolyl, xylyl, naphthyl, and dimethylnaphthyl monomaleate or monofumarate, including various isomers of the alkyl or aryl moiety.

The acrylic ester/butenedioic ester copolymer and the ethylene/acrylic ester/butenedioic ester terpolymer of the present invention can be readily prepared following any known procedures for the preparation of copolymers and terpolymers; for example, by the free radical-initiated emulsion polymerization or bulk or solution polymerization, especially in the presence of organic hydroperoxides, peroxides, or diazo compounds.

Representative polymerization methods are disclosed, for example, in U.S. Pat. Nos. 2,599,123; 3,201,373; and 3,639,326. The melt indices of the polymers useful in the compositions of this invention are about 0.1–50 at 190°C., as determined by the method of ASTM-D-1238-52T. The preferred melt indices are 0.5–15.

The polymeric compositions of the present invention are vulcanized for about 0.5–45 minutes at about 160°–235°C., preferably 10–30 minutes at about 175°–180°C. Suitable curing agents include the following aliphatic amines: hexamethylenediamine (HMDA), hexamethylenediamine carbamate (HMDAC), tetramethylenepentamine (TEPA), HMDA-cinnamaldehyde adduct, and HMDA-dibenzoate salt. The following aromatic amines also are suitable curing agents: 4,4'-methylenedianiline, 4,4'-oxydiphenylamine, m-phenylenediamine, p-phenylenediamine, and 4,4'-methylenebis(o-chloroaniline). The preferred curing agents are hexamethylenediamine carbamate and 4,4'-methylenedianiline. The amount of the amine used in this vulcanization process is about 0.06–0.30 mole of amino function per kilogram of polymer, preferably 0.12–0.22 mole per kilogram. Below the lower limit, the polymer tends to be undercured; while above the upper limit, the polymer tends to have impractically low elongation and poor heat aging resistance. It is to be noted that suitable polyamines must have primary amino groups. Tertiary polyamines do not function as vulcanizing agents for the compositions of this invention, while secondary polyamines produce inferior vulcanizates.

The vulcanization accelerators belong to the following classes:

1. alkali metal salts of weak inorganic acids and alkali metal hydroxides;
2. alkali metal salts of weak organic acids, alkali metal alcoholates and phenolates;
3. quaternary ammonium and quaternary phosphonium hydroxides, alcoholates, phenolates, halides, and salts with weak acids;
4. tertiary amines;
5. guanidine, aryl- and alkylguanidines; and 6. heterocyclic, tertiary amines.

Examples of class (1) accelerators include sodium, potassium, and lithium hydroxides, phosphates, carbonates, bicarbonates, borates, hydrogen phosphates, and dihydrogen phosphates. The preferred accelerator is sodium hydroxide. The amount of a class (1) accelerator is 0.02 – 0.2 mole per kilogram of polymer; the preferred amount is 0.06 – 0.10 mole per kilogram.

Representative class (2) accelerators are sodium methoxide, potassium stearate, sodium and potassium isopropoxides, potassium laurate, sodium or potassium phenoxides, benzoates, or salts of lower aliphatic acids, e.g., acetates, and formates. The preferred accelerator is potassium stearate. About 0.02 – 0.2 mole of the accelerator per kilogram of polymer will be used, the range of 0.06 – 0.10 mole per kilogram being preferred.

Class (3) accelerators include, for example, tetrabutylammonium hydroxide, $(C_8H_{17}-C_{10}H_{21})_3(CH_3)NCl$ (sold under the trade name, Aliquat 336, by General Mills, Chemical Div., Kankakee, Ill.), benzyltriphenylphosphonium chloride, tetrabutylammonium methoxide, and tetrabutylammonium stearate. The preferred compounds are tetrabutylammonium hydroxide and $(C_8H_{17}-C_{10}H_{21})_3(CH_3)NCl$. These accelerators are used at a level of 0.01 – 0.1 mole per kilogram of polymer, preferably 0.02 – 0.05 mole per kilogram of polymer.

Tertiary amines representative of class (4) accelerators include triethylenediamine, N,N,N',N'-tetramethyl-1,4-butanediamine, N,N,N',N'-tetramethyl-2,6-diaminophenol, and N,N-dimethylaminoethanol. Triethylenediamine is the preferred accelerator in this class. About 0.01–0.1 mole of accelerator of this class per kilogram of polymer is used, the range of 0.02–0.05 mole per kilogram being preferred.

Representative class (5) accelerators include tetramethylguanidine, tetraethylguanidine and diphenylguanidine. The level of application of class (5) accelerators is 0.01–0.12 mole per kilogram of polymer, preferably 0.02–0.09 mole per kilogram.

Typical class (6) accelerators include imidazole, pyridine, quinoline, and N-phenylmorpholine. The preferred amine of this class is imidazole. Class (6) accelerators are used in amounts of 0.02–0.09 moles per kilogram of polymer.

Two or more accelerators as defined herein may be used.

The preferred accelerators are those of classes (4) and (5), above,e because they have the minimum effect on compound scorch (premature curing at low temperature) and on the heat resistance of the vulcanizates.

From the standpoint of $K_b$ limitations, two acceptable accelerators can be selected as more or less extreme cases: the formate anion, which has a $K_b$ of $5 \times 10^{-11}$, and the methoxide anion, which has a $K_b$ of $10^4$.

The vulcanizates of the present invention may also contain an antioxidant system based on a phosphorus ester antioxidant, a hindered phenolic antioxidant, and amine antioxidant, or a mixture of two or more of these compounds. The phosphorus ester compound can be, for example:

tris(mixed mono- and dinonylphenyl) phosphite,
tricresyl phosphate,
tris(3,4-di-t-butyl-4-hydroxyphenyl) phosphate,
a high molecular weight poly(phenolic phosphonate), or
6-(3,5-di-t-butyl-4-hydroxy)benzyl-6H-dibenz[c,e]-[1,2]oxaphosphorin-6-oxide.

The hindered phenolic compounds include, for example, the following:
4,4-butylidenebis(6-t-butyl-m-cresol),
1,3,5-trimethyl-2,4,6-tris(3,5-di-t-butyl-4-hydroxybenzyl)benzene,
2,6-di-t-butyl-2-dimethylamino-p-cresol, and
4,4'-thiobis(3-methyl-6-t-butylphenol).

Suitable amine antioxidants include, among others, the following: polymerized 2,2,4-trimethyl-1,2-dehydroquinoline; N-phenyl-N'-(p-toluenesulfonyl)-p-phenylenediamine; N,N'-di(β-naphthyl)-p-phenylenediamine; low temperature reaction product of phenyl(β-naphthyl)amine and acetone; and 4,4'-bis(α,α-dimethylbenzyl)diphenylamine.

The proportion of the antioxidant compound in the vulcanizing composition is 0.1-5 parts per 100 parts of polymer, the preferred proportion being 1-3.

The antioxidant is recommended for good heat aging compositions. The antioxidant effect is usually low below the preferred range and impractically low below the broad range recited above. Above the higher limits, little additional improvement is observed. The weight ratio of the phenolic or amine antioxidant to the phosphorus compound in the mixtures is about 0.5-3, the preferred ratio being about 1.

The preferred antioxidant compositions contain tris(-mixed mono-and dinonylphenyl) phosphite in mixture with either 4,4'-bis(α,α-dimethylbenzyl)diphenylamine or 4,4'-butylidenebis(6-t-butyl-m-cresol).

It is often desirable to add fillers to reduce cost or to improve or modify the physical properties of the products.

A typical vulcanized composition will usually contain about 15-40 volume percent of fillers, for example, carbon black, barium sulfate, magnesium silicate, or silica. Other conventional fillers can also be used. The preferred proportion of the fillers is 20-25 volume percent.

Below the lower limit, the improvement of tensile properties by filler reinforcement is quite low; while above the upper limit, the heat aging resistance of the polymer is adversely affected.

The invention is now illustrated by the following examples of certain representative embodiments thereof, wherein all parts, proportions, and percentages are by weight unless indicated otherwise.

EXAMPLES 1–15

The rubber stocks for each of the examples were prepared by mixing on a 4 × 8 inch rubber mill at room temperature a masterbatch containing 100 parts of elastomer (composition indicated in Table I), 50 parts of FEF carbon black, 1 part of trisnonylphenyl phosphite, 1 part of 4,4'-butylidenebis-(6-t-butyl-m-cresol), and the curing agent (kind and amount indicated in Table I). Samples 1 and 4 also contained 1 part of stearic acid and 0.15 part of sulfur. Samples 6B and 7B contained 1 part of 4,4'-thiobis(6-t-butyl-m-cresol), and sample 7A contained one part of 4,4'-bis(α,α-dimethylbenzyl)diphenylamine instead of the 4,4'-butylidene-bis-(6-t-butyl-m-cresol). This masterbatch was divided into two equal parts, and the accelerator (kind and amount indicated in Table I) was added to one part. Further operations with the rubber stocks were carried out within 24 hours of the mill mixing.

Slabs for aging specimens and pellets for compression set measurements were cured in presses at about 650 psi pressure and 180°C. for 30 min. Molds were loaded and unloaded hot. Compression set of the cured pellets was measured after 70 hrs. at 150°C. by ASTM Method D–395. Percent volume swell of the cured vulcanizates in ASTM No. 3 oil for 3 days at 150°C. was measured by ASTM Method D–471. Mooney scorch of the uncured stocks was measured by ASTM Method D–1646 (minutes to 10 point rise at 250°F.). The cured vulcanizates were heat-aged at 177°C. for 14 days, and $T_B$ (tensile strength at break) and $E_B$ (elongation at break) were measured by ASTM Method D–412. Oscillating Disk Rheometer (ODR) measurements were obtained on the uncured stocks by ASTM Method D–2705.

Figure 2:
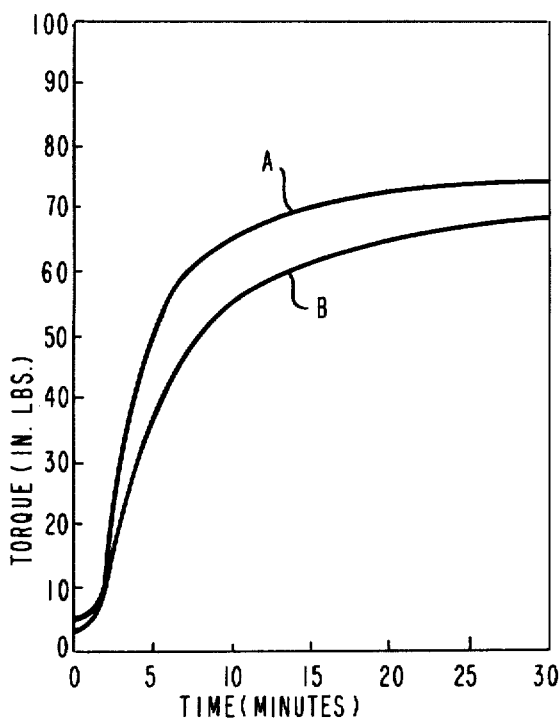
Figure 2:
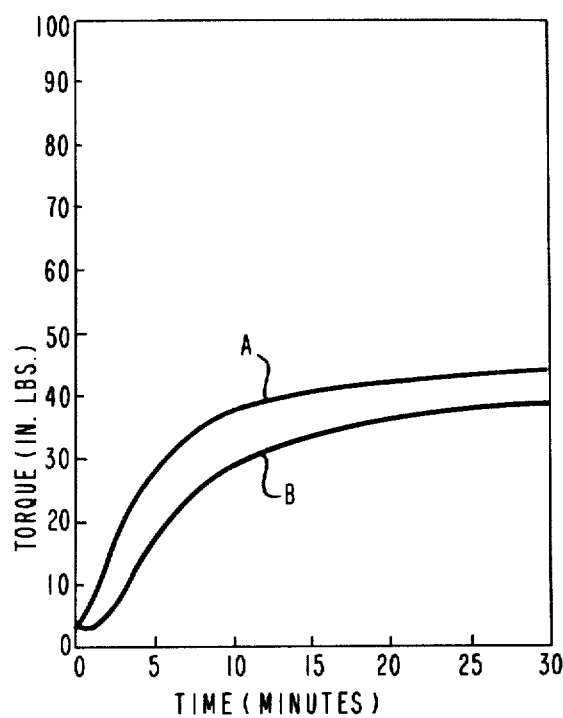
Figure 2:
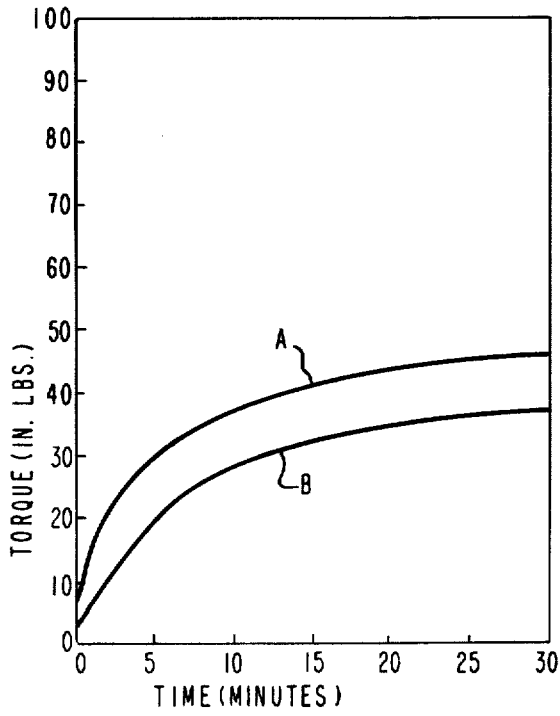
Figure 2:
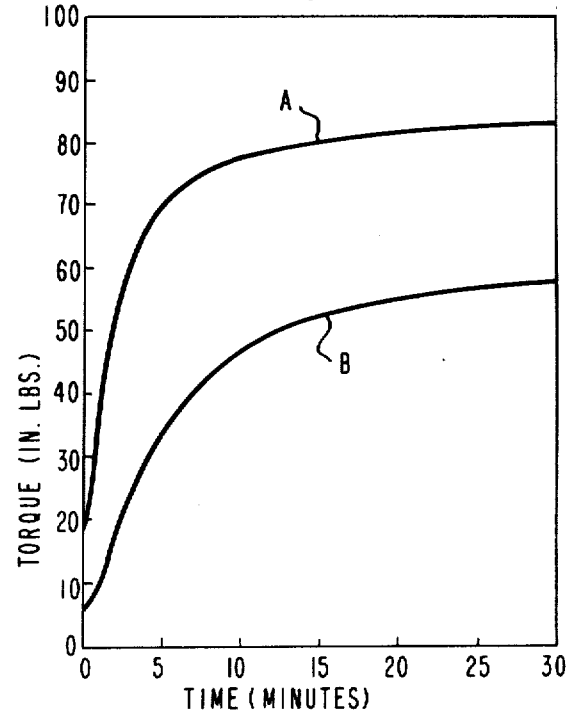
Figure 3:
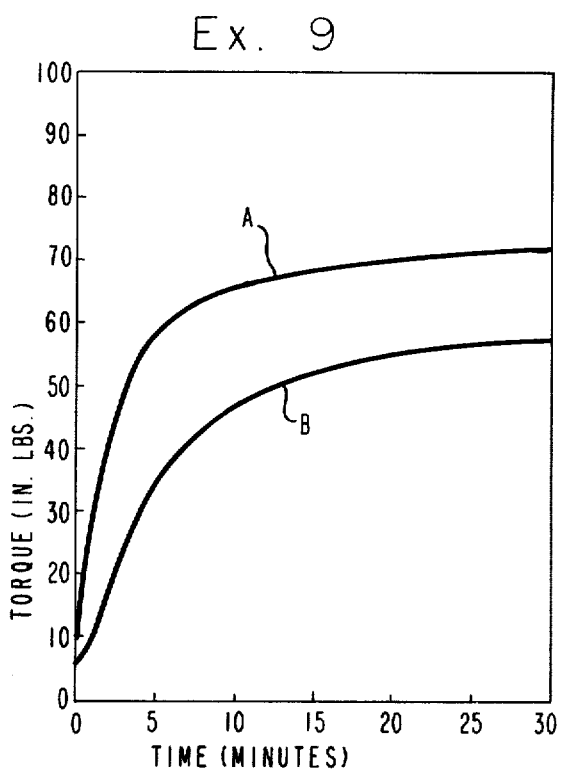
Figure 3:
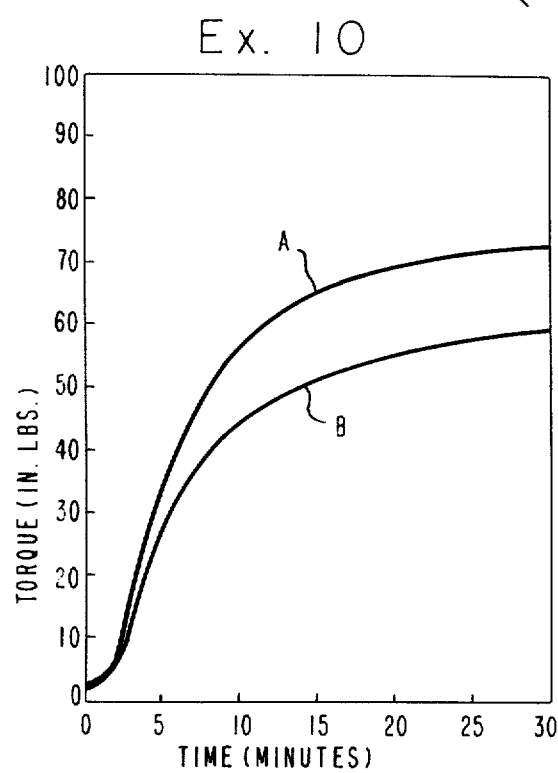
Figure 3:
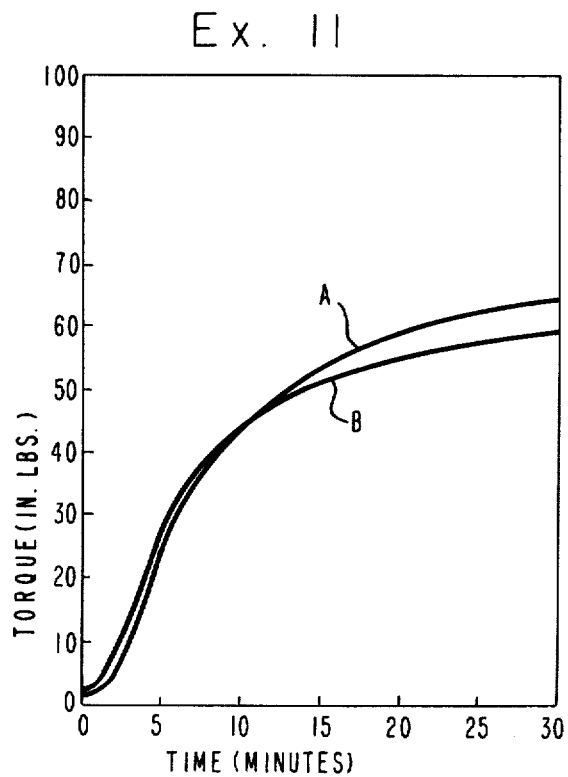
Figure 3:
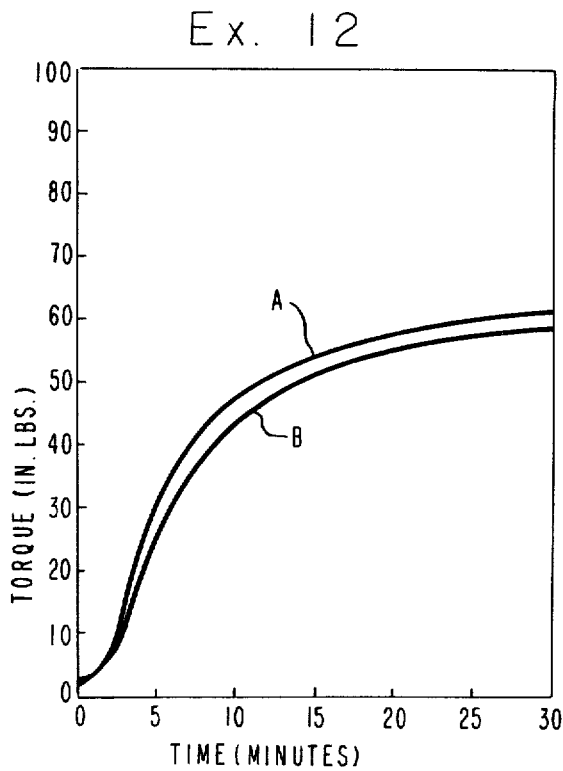
Figure 4:
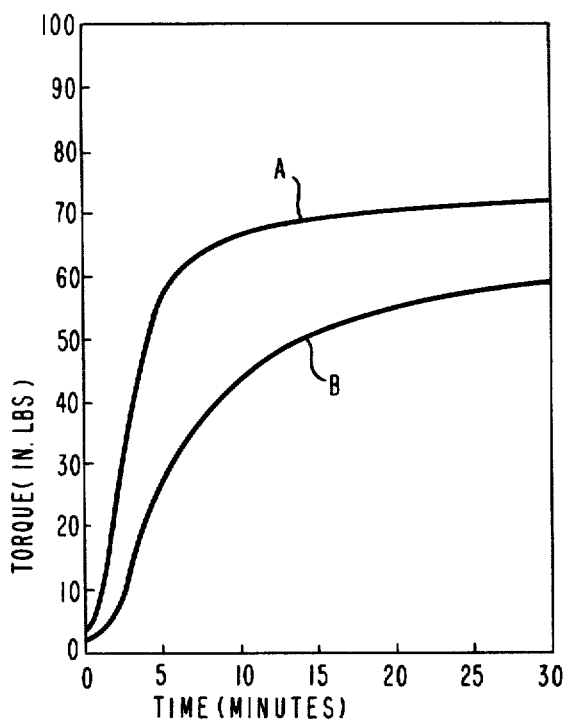
Figure 4:
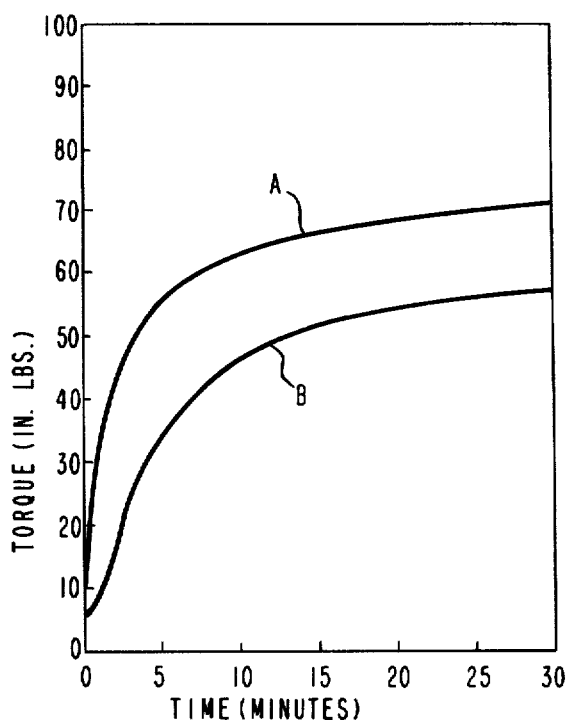
Figure 4:
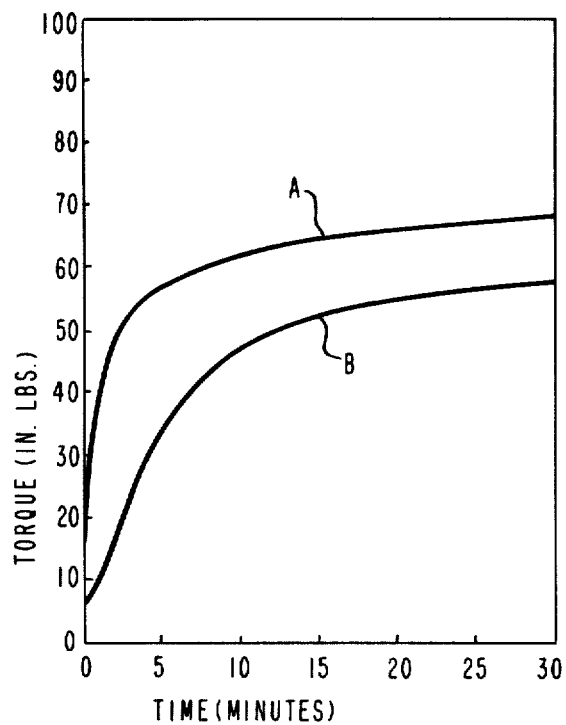

The ODR data are shown in FIGS. 1–4. The figures show that the stocks (A samples) containing the accelerator exhibit a more rapid rate of cure than the corresponding stocks without the accelerator (B samples). The figures further show that the samples containing the accelerators exhibit higher states of cure after 30 min. than those without the accelerator. That is accelerator-containing samples have a higher state of cure is additionally demonstrated by the lower compression set and lower oil swell compared to the samples without accelerator. Frequently, Mooney scorch time is either unaffected or decreased somewhat by the addition of accelerators. Tensile properties after heat aging generally do not change much.

TABLE I

RUBBER COMPOSITIONS

| Example | Polymer [a] | Curing Agent [b] | Conc. [c] | Accelerator | Conc. [c] |
|---|---|---|---|---|---|
| 1A | A | HMDAC | 0.072 | 50% aqueous sodium hydroxide | 0.029 |
| 1B | do. | do. | do. | none | |
| 2A | B | TEPA | 0.064 | 50% aqueous sodium hydroxide | 0.029 |
| 2B | do. | do. | do. | none | |
| 3A | C | HMDAC | 0.072 | trisodium phosphate | [d] |
| 3B | do. | do. | do. | none | |
| 4A | A | do. | do. | sodium methoxide | 0.030 |
| 4B | do. | do. | do. | none | |
| 5A | B | TEPA | 0.064 | sodium methoxide | 0.030 |
| 5B | do. | do. | do. | none | |
| 6A | D | HDMAC | 0.072 | potassium stearate | 0.021 |
| 6B | do. | do. | do. | none | |
| 7A | E | do. | do. | tetra-t-butylammonium stearate | 0.062 |
| 7B | do. | do. | do. | none | |
| 8A | F | do. | 0.094 | tetra-t-butylammonium hydroxide | 0.037 |
| 8B | do. | do. | do. | none | |
| 9A | do. | do. | do. | benzyl trimethylammonium hydroxide | 0.037 |
| 9B | do. | do. | do. | none | |
| 10A | G | HMDA | 0.093 | triethylenediamine | 0.038 |
| 10B | do. | do. | do. | none | |
| 11A | do. | do. | do. | tetramethylbutanediamine | 0.038 |
| 11B | do. | do. | do. | none | |
| 12A | do. | do. | do. | N,N,N',N'-tetramethyl-2,6-diaminophenol | 0.038 |
| 12B | do. | do. | do. | none | |
| 13A | do. | do. | do. | tetramethylguanidine | 0.038 |
| 13B | do. | do. | do. | none | |
| 14A | F | HMDAC | 0.094 | tri $C_8$–$C_{10}$ alkyl methyl ammonium chloride | 0.037 |
| 14B | do. | do. | do. | none | |
| 15A | do. | do. | do. | benzyltriphenylphosphonium chloride | 0.038 |
| 15B | do. | do. | do. | none | |

[a] A — ethylene (E)/43% methyl acrylate (MA)/3.5%
 ethyl hydrogen maleate (EHM), melt index 0.6 (ASTM D-1238-52T)
 B — E/51% MA/3.5% EHM, m.i. 0.7
 C — E/50% MA/4.3% EHM, m.i. 5.0
 D — E/49% MA/3.7% EHM, m.i. 0.95
 E — E/51% MA/4.0% EHM, m.i. 0.95
 F — E/51% MA/3.9% EHM, m.i. 0.95
 G — E/51% MA/3.5% EHM, m.i. 0.7

[b] HMDAC — hexamethylenediamine carbamate
 TEPA — tetraethylenepentamine
 HMDA — hexamethylenediamine

[c] moles/kilogram polymer

[d] polymer pellets surface-coated with aqueous 0.1M $Na_3PO_4$

TABLE II

RUBBER PROPERTIES

| Example | Compression Set [a] | Oil Swell [b] | Mooney Scorch [c] | Heat Aged Tensile Data [d] | |
|---|---|---|---|---|---|
| | | | | $T_B$ | $E_B$ |
| 1A | 82% | 161 vol. % | 9.6 min. | 970 psi [e] | 95 % [e] |
| 1B | 93 | 184 | 10.2 | 850 [e] | 100 [e] |
| 2A | 66 | 95 | 7.2 | 1300 | 80 |
| 2B | 68 | 100 | 7.1 | 1410 | 80 |
| 3A | — | 157 | 8.8 | 1160 | 90 |
| 3B | — | 176 | 10.7 | 950 | 170 |
| 4A | 85 | 172 | 8.4 | 970 [e] | 90 [e] |
| 4B | 93 | 184 | 10.2 | 850 [e] | 100 [e] |

TABLE II — Continued

RUBBER PROPERTIES

| Example | Compression Set [a] | Oil Swell [b] | Mooney Scorch [c] | Heat Aged Tensile Data [d] | |
|---|---|---|---|---|---|
| | | | | $T_B$ | $E_B$ |
| 5A | 64 | 96 | 7.5 | 1550 | 95 |
| 5B | 68 | 100 | 7.1 | 1410 | 80 |
| 6A | 57 | 122 | 8.0 | 1000 | 90 |
| 6B | 84 | 139 | 9.9 | 1200 | 100 |
| 7A | 36 | 85 | 2.1 | 760 | 80 |
| 7B | 82 | 123 | 8.5 | 950 | 80 |
| 8A | — | 75 | — | 1100 | 90 |
| 8B | — | 107 | 9.5 | 1125 | 100 |
| 9A | 86 | 88 | 7.3 | 985 | 90 |
| 9B | — | 107 | 9.5 | 1125 | 100 |
| 10A | 64 | 84 | 17.7 | 1300 | 120 |
| 10B | 86 | 107 | 16.5 [f] | 1340 | 120 |
| 11A | 70 | 88 | — | 1415 | 120 |
| 11B | 86 | 107 | — | 1340 | 120 |
| 12A | 77 | 89 | — | 1400 | 120 |
| 12B | 86 | 107 | — | 1340 | 120 |
| 13A | 50 | 82 | 9.5 | 1385 | 110 |
| 13B | 86 | 107 | 16.5 [f] | 1340 | 120 |
| 14A | 77 | 80 | 4.1 | 1000 | 85 |
| 14B | — | 107 | 9.5 | 1125 | 100 |
| 15A | 72 | 75 | 4.4 | 1030 | 80 |
| 15B | 13 | 107 | 9.5 | 1125 | 100 |

[a] 70 hours at 150°C.
[b] 3 days at 150°C. in ASTM No. 3 oil
[c] Minutes to 10 point rise at 250°F.
[d] Samples heat aged 14 days at 177°C.
[e] Samples aged 70 hours at 204°C.
[f] Polymer composition: ethylene/52% methyl acrylate/ 2.6% ethyl hydrogen maleate, melt index 1.2

EXAMPLE 16

The following ingredients were mixed on a rubber mill, and an ODR curve was obtained as described in Examples 1 – 15.

100 parts ethylene/51 percent methyl acrylate/3.5 percent ethyl hydrogen maleate
50 parts FEF black
1 part tris(nonylphenyl phosphite)
1 part 4,4′-butylidenebis(6-t-butyl-m-cresol)
0.4 parts triethylenediamine The ODR scan did not rise above its initial value for 30 minutes at 180°C. This experiment demonstrates that although diprimary diamines are curing agents for the polymer, ditertiary amines do not function as such, but only as accelerators as demonstrated in Example 10.

EXAMPLES 17–19

Samples of ethyl acrylate/4 percent ethyl hydrogen fumarate polymer were compounded by procedures similar to those described in Examples 1-15. The stocks were then vulcanized and tested as described in Examples 1-15. Modulus at 100 percent elongation ($M_{100}$) and Permanent Set were measured by ASTM Method D-412. The sample composition and testing data are shown in Table III. The ODR data are shown in FIG. 5.

The data show that the accelerator compounds potassium stearate, sodium hydroxide, and tetrabutylammonium hydroxide increase both the rate and the degree of vulcanization of the ethyl acrylate/ethyl hydrogen fumarate polymer.

TABLE III

| Example | 17A | 17B | 18A | 18B | 19A | 19B |
|---|---|---|---|---|---|---|
| Rubber Composition | | | | | | |
| Polymer | 100 | 100 | 100 | 100 | 100 | 100 |
| FEF Black | 50 | 50 | 50 | 50 | 50 | 50 |
| Stearic Acid | 1 | 1 | 1 | 1 | 1 | 1 |
| Trisnonylphenylphosphite | 1 | 1 | 1 | 1 | 1 | 1 |
| 4,4′-Butylidenebis(4-t-butyl-m-cresol) | 1 | 1 | 1 | 1 | 1 | 1 |
| Hexamethylenediamine Carbamate | 1.0 | 1.15 | 1 | 1 | — | — |
| 4,4′-Methylenedianiline | — | — | — | — | 1.3 | 1.3 |
| Potassium Stearate | 2.0 | — | — | — | — | — |
| Sodium Hydroxide | — | — | 0.67 | — | — | — |
| Tetrabutylammonium Hydroxide | — | — | — | — | 0.97 | — |
| Rubber Properties | | | | | | |
| $M_{100}$ (psi) | 750 | 520 | 830 | 500 | 1150 | 240 |
| $E_B$ (%) | 180 | 310 | 120 | 260 | 140 | 630 |
| Permanent Set (%) | 0 | 6 | 1 | 5 | 1 | 37 |
| Mooney Scorch | 3.4 | 4.7 | — | — | 11.4 | >30 |
| ODR Data, Fig. | 16 | 16 | 17 | 17 | 18 | 18 |

EXAMPLE 20

The samples were compounded, cured, and tested as described for Examples 1–15. The ODR data are shown in FIG. 5. Compositions and physical properties are shown in Table IV. This example illustrates that, even though satisfactory cure of terpolymer could not be obtained in the presence of 4,4'-methylenedianiline alone, good vulcanized products were obtained in the presence of accelerators of this invention.

TABLE IV

| Example Composition | 20A | 20AA | 20B |
|---|---|---|---|
| Polymer[a] | 1 | 1 | 2 |
| parts | 100 | 100 | 100 |
| FEF Black | 50 | 50 | 50 |
| Trisnonylphenylphosphite | 1 | 1 | 1 |
| 4,4'-Bis(α, α-dimethylbenzyl)diphenyl amine | 1 | 1 | 1 |
| Tetramethylguanidine (moles/kg) | 0.058 | — | — |
| Tetra-n-butylammonium hydroxide (moles/kg) | — | 0.023 | — |
| 4,4'-Methylenedianiline | 1.44 | 1.44 | 1.44 |
| Properties | | | |
| Mooney Scorch | 16.2 | [b] | [c] |
| Compression Set[d] | 39 | 66 | 100+ |
| Original Stress-Strain Properties | | | |
| $M_{100}$ | 980 psi | 760 | [e] |
| $T_B$ | 2730 psi | 2450 | |
| $E_B$ | 260 % | 260 | |
| Permanent Set | 6 | 8 | |
| Heat-aged 14 days/177°C. | | | |
| $M_{100}$ | 1210 psi | 890 | — |
| $T_B$ | 1420 psi | 1000 | — |
| $E_B$ | 120 % | 110 | — |

[a] Polymer 1 — ethylene/53 wt. % methyl acrylate, 6.2 ethyl hydrogen maleate, melt index 4.2
Polymer 2 — ethylene/53 methyl acrylate/4.5 ethyl hydrogen maleate, melt index 4.0
[b] 4 pt. rise in 30 min.
[c] 0.4 pt. rise in 30 min.
[d] 70 hrs./150°C.
[e] Not cured sufficiently to test For the purpose of the following composition claims, the expression "consisting essentially" means that, in addition to the components specifically recited therein, the composition may also contain other components which do not adversely affect the suitability of the composition for its intended use.

We claim:

1. An elastomeric composition having good scorch resistance, said composition consisting essentially of
   1. a polymeric component which is an acrylic ester/butenedioic acid monester dipolymer or ethylene/acrylic ester/butenedioic acid monoester terpolymer,
   2. a vulcanizing agent selected from polyfunctional, organic, primary amines and their salts, the amount of the polyamine being about 0.06 – 0.30 mole of amino function per kilogram of polymer, and
   3. at least one vulcanization accelerator selected from bases and conjugate bases whose $K_b$ at 25°C in water is comprised within the range of $10^{-12}$ to $10^6$ and which do not cause crosslinking by reaction with ester groups; with the provisos that the acrylic ester is a $C_1$–$C_4$ alkyl acrylate or methacrylate; the butenedioic acid monester is a $C_1$–$C_{12}$ alkyl or $C_6$–$C_{12}$ aryl monoester; the dipolymer contains about 1–10 weight percent of the butenedioic acid monoester; and the terpolymer contains about 2 to 10 weight percent of the butenedioic acid monoester, and the proportion of all the ester groups in the terpolymer is equivalent to about 2.5 – 8.0 moles of ester groups per kilogram of polymer.

2. The composition of claim 1 wherein the accelerator is selected from the group consisting of
   a. 0.02 – 0.2 mole per kilogram of polymer of alkali metal salts or weak inorganic acids and alkali metal hydroxides;
   b. 0.02 – 0.2 mole per kilogram of polymer of alkali metal salts of weak organic acids, alkali metal alcoholates and phenolates;
   c. 0.01 – 0.1 mole per kilogram of polymer of quaternary ammonium and quaternary phosphonium hydroxides, alcoholates, halides, and salts with weak acids;
   d. 0.01 – 0.1 mole per kilogram of polymer of tertiary amines;
   e. 0.02 – 0.09 mole per kilogram of polymer of guanidine and aryl- and alkylguanidines; and
   f. 0.02 – 0.09 mole per kilogram of polymer or heterocyclic tertiary amines.

3. A composition of claim 1 wherein the vulcanizing agent is selected from the group consisting of HMDA, HMDAC, HMDA-cinnamaldehyde adduct, HMDA-dibenzoate salt, TEPA, 4,4'-methylenedianiline, 4,4'-oxydiphenylamine, m-phenylenediamine, p-phenylenediamine, and 4,4'-methylenebis(o-chloroaniline); and the vulcanization accelerator is selected from the group consisting of potassium stearate, tetrabutylammonium hydroxide, $(C_8H_{17}$–$C_{10}H_{21})_3(CH_3)NCl$, triethylenediamine, N,N-dimethylaminoethanol, tetramethylguanidine, tetraethylguanidine and imidazole.

4. A composition of claim 1 also containing 15 – 40 volume percent of fillers.

5. A composition of claim 4 wherein the proportion of fillers is 20 – 25 volume percent.

6. A composition of claim 1 also containing 0.1 – 5 parts by weight of at least one antioxidant per hundred parts by weight of the polymer, the antioxidant being selected from phosphorus esters, hindered phenols, and amines.

7. A composition of claim 6 wherein the proportin of antioxidant is 1 – 3 parts per 100 parts of polymer.

8. A composition of claim 7 wherein the antioxidant is tris(mixed mono- and dinonylphenyl)phosphite in mixture with 4,4'-bis($\alpha,\alpha$-dimethylbenzyl)diphenylamine or with 4,4'-butylidenebis($\beta$-$t$-butyl-$m$-cresol).

9. A vulcanized elastomeric composition, having good heat stability, said composition being obtained by curing a composition of claim 1 for 0.5 – 45 minutes at about 160°–235°C.

10. A vulcanized elastomeric composition, having good heat stability, said composition being obtained by curing a composition of claim 1 for 10 – 30 minutes at about 175°– 180°C.

* * * * *